(12) United States Patent
Srighakollapu et al.

(10) Patent No.: US 8,472,219 B2
(45) Date of Patent: Jun. 25, 2013

(54) METHOD AND SYSTEMS FOR CONVERTING POWER

(75) Inventors: N V S Kumar Srighakollapu, Hyderabad (IN); Remesh Kumar Keeramthode, Secunderabad (IN); Rajesh Posa, Hyderabad (IN)

(73) Assignee: General Electric Company, Schenectady, NY (US)

( * ) Notice: Subject to any disclaimer, the term of this patent is extended or adjusted under 35 U.S.C. 154(b) by 2 days.

(21) Appl. No.: 13/232,425

(22) Filed: Sep. 14, 2011

(65) Prior Publication Data

US 2012/0092905 A1 Apr. 19, 2012

(51) Int. Cl.
*H02M 7/5387* (2007.01)
*H02J 1/10* (2006.01)

(52) U.S. Cl.
USPC ............................................. 363/65; 363/132

(58) Field of Classification Search
USPC .................. 363/16, 17, 21.02, 21.12, 65, 67, 363/69, 71, 97, 98, 131, 132
See application file for complete search history.

(56) References Cited

U.S. PATENT DOCUMENTS

| | | | | |
|---|---|---|---|---|
| 5,796,595 | A * | 8/1998 | Cross | 363/71 |
| 6,787,931 | B2 * | 9/2004 | Nakagawa et al. | 290/31 |
| 7,295,448 | B2 | 11/2007 | Zhu | |
| 7,583,109 | B2 * | 9/2009 | Oughton et al. | 327/108 |
| 7,619,323 | B2 * | 11/2009 | Tan et al. | 307/82 |
| 7,796,412 | B2 | 9/2010 | Fornage | |
| 2010/0097827 | A1 | 4/2010 | Ben-Yaakov | |
| 2012/0081937 | A1 * | 4/2012 | Phadke | 363/95 |

OTHER PUBLICATIONS

Komkrit Chomsuwan, Prapart Prisuwanna, and Veerapol Monyakul, Photovoltaic Grid-Connected Inverter Using Two-Switch Buck-Boost Converter, pp. 1527-1530, Department of Electrical Engineering, King Mongkut's Institute of Technology Ladkrabang, Thailand, Copyright 2002 IEEE.

* cited by examiner

*Primary Examiner* — Matthew Nguyen
(74) *Attorney, Agent, or Firm* — Global Patent Operation

(57) ABSTRACT

A power conversion system includes a first converter coupled to a power source, wherein the first converter includes an input side, and an output side electrically isolated from the input side. The power conversion system also includes a second converter coupled to the power source, wherein the second converter includes an input side, and an output side electrically isolated from the input side. The second converter input side is coupled in parallel with the first converter input side, and the second converter output side is coupled in series with the first converter output side. The power conversion system also includes an inverter coupled to the first converter output side and to the second converter output side, and the inverter supplies alternating current to an electrical distribution network.

20 Claims, 5 Drawing Sheets

METHOD AND SYSTEMS FOR CONVERTING POWER

BACKGROUND OF THE INVENTION

The present application relates generally to power systems and, more particularly, to a method and systems for use in converting power.

In some known solar power systems, a plurality of photovoltaic panels (also known as solar panels) are logically or physically grouped together to form an array of solar panels. The solar panel array converts solar energy into electrical energy and transmits the energy to an electrical grid or another destination.

Solar panels generally output direct current (DC) electrical power. To properly couple such solar panels to an electrical grid, the electrical power received from the solar panels must be converted to alternating current (AC). At least some known power systems use a power converter system to convert DC power to AC power. Additionally, at least some known solar power converter systems also include an inverter. The converter adjusts an amount of power received from the solar panels. The inverter converts the DC power received from the solar panels into AC power to be supplied to the electrical grid. The converter and the inverter may be controlled by a control system to maximize the power received from the solar panels and to convert the received DC power into AC power that complies with utility grid requirements.

However, known power converter systems may be inefficient, and may result in a loss of energy supplied to the electrical grid. For example, known converters may be switched at a high frequency to maximize the power output from the solar panels. Such a high frequency switching rate may cause undesirable amounts of lost power within one or more switching devices of the converters.

BRIEF DESCRIPTION OF THE INVENTION

In one aspect, a power conversion system is provided that includes a first converter and a second converter coupled to a power source. The first converter and the second converter each includes an input side, and an output side electrically isolated from the input side. The second converter input side is coupled in parallel with the first converter input side, and the second converter output side is coupled in series with the first converter output side. The power conversion system also includes an inverter coupled to the first converter output side and to the second converter output side to supply alternating current to an electrical distribution network.

In another aspect, a method for adjusting power is provided that includes receiving, from a power source, a direct current (DC) voltage and current by a first converter and a second converter coupled in parallel with the first converter. At least one of the voltage and the current within the first converter is adjusted using a first switching device, and at least one of the voltage and the current within the second converter is adjusted using a second switching device. Alternating current (AC) voltage and current is supplied to an inverter through an output of the first converter and an output of the second converter, and the output of the first converter is coupled in series with the output of the second converter. The AC voltage and current is adjusted by the inverter, and the adjusted AC voltage and current is supplied to an electrical distribution network.

In another aspect, a power conversion system is provided that includes a first converter and a second converter coupled to a solar power source. The first converter includes an input side, an output side, and a first switching device, and the second converter includes an input side, an output side, and a second switching device. The second converter input side is coupled in parallel with the first converter input side and the second converter output side is coupled in series with the first converter output side. The power conversion system also includes an inverter coupled to the first converter output side and to the second converter output side, and the inverter supplies alternating current to an electrical distribution network. The power conversion system also includes a control system coupled to the first converter, the second converter, and the inverter. The control system is configured to control the first switching device and the second switching device.

DETAILED DESCRIPTION OF THE INVENTION

Exemplary embodiments of a method and systems for converting power are described herein. These embodiments facilitate converting direct current (DC) power received from a power source, such as a solar power source including an array of photovoltaic panels, into alternating current (AC) power to be supplied to an electrical distribution network. A power conversion system uses a plurality of switching devices within a first converter and a second converter to adjust the power output of the power source, and switches the devices at a zero crossing of the voltage and/or current within the first and second converters to reduce switching losses during operation of the switching devices. The switching devices are also operated in an interleaved pattern to reduce an input current ripple. The inputs of the first and second converters are coupled together in parallel and the outputs of the first and second converters are coupled together in series to increase the output voltage of the combination of converters. The inverter includes a plurality of inverter switching devices arranged in an H-bridge configuration. The inverter switching devices are switched at a zero crossing of the voltage of the electrical distribution network to reduce switching losses within the inverter.

Figure 1:
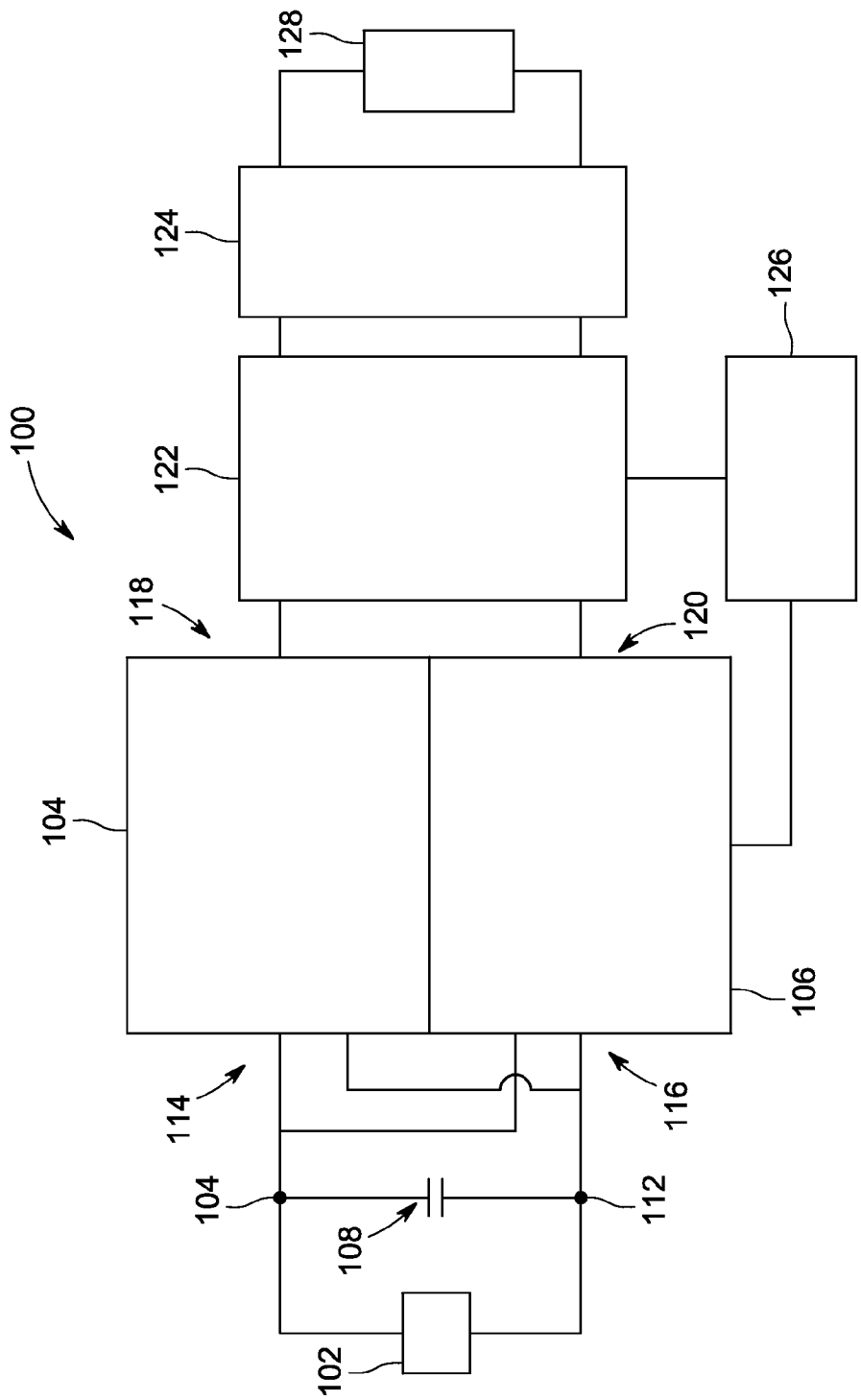
FIG. 1 is a schematic block diagram of an exemplary power conversion system.

FIG. 1 is a schematic block diagram of an exemplary power conversion system 100. A power source 102 is coupled to power conversion system 100 to supply electrical current to system 100. In an exemplary embodiment, power source 102 is a photovoltaic, or "solar" array that includes at least one photovoltaic panel. Alternatively or additionally, power source 102 includes at least one fuel cell, a direct current (DC) generator, and/or any other electric power source that enables power conversion system 100 to function as described herein.

In an exemplary embodiment, power conversion system 100 includes a first converter 104 and a second converter 106. Alternatively, power conversion system 100 may include any number of converters that enables system 100 to function as described herein. An input capacitor 108 is coupled in parallel with power source 102 to supply an input voltage to first and second converters 104 and 106, respectively. More specifically, input capacitor 108 is coupled between a first node 110 and a second node 112 of power source 102 such that electrical current is transmitted from power source 102 through first node 110 and electrical current is returned to power source 102 through second node 112.

An input side 114 of first converter 104 is coupled in parallel with an input side 116 of second converter 106. In addition, an output side 118 of first converter 104 is coupled in series with an output side 120 of second converter 106.

Power conversion system 100 also includes an inverter 122, a filter 124, and a control system 126 that controls the operation of inverter 122, first converter 104, and second converter 106. Output sides 118 and 120 are coupled to inverter 122, and inverter 122 is coupled to filter 124. In addition, first converter 104 and second converter 106 are isolated converters such that input sides 114 and 116 are electrically isolated from output sides 118 and 120. In an exemplary embodiment, filter 124 is coupled to an electrical distribution network 128, such as a power grid of a utility company.

During operation, power source 102 generates a substantially direct current (DC), and a DC voltage is generated across input capacitor 108. The DC voltage and current are supplied to first converter 104 and second converter 106. In an exemplary embodiment, control system 126 controls first converter 104 and second converter 106 to convert the DC voltage and current to a substantially rectified alternating current (AC) voltage and current. The AC voltage and current are transmitted to inverter 122, and control system 126 controls inverter 122 to adjust a frequency, a phase, an amplitude, and/or any other characteristic of the AC voltage and current to match the electrical distribution network 128 characteristics. The adjusted AC voltage and current are transmitted to filter 124 for removing one or more undesired characteristics from the AC voltage and current, such as undesired frequency components and/or undesired voltage ripples. The filtered AC voltage and current are then supplied to electrical distribution network 128.

Figure 2:
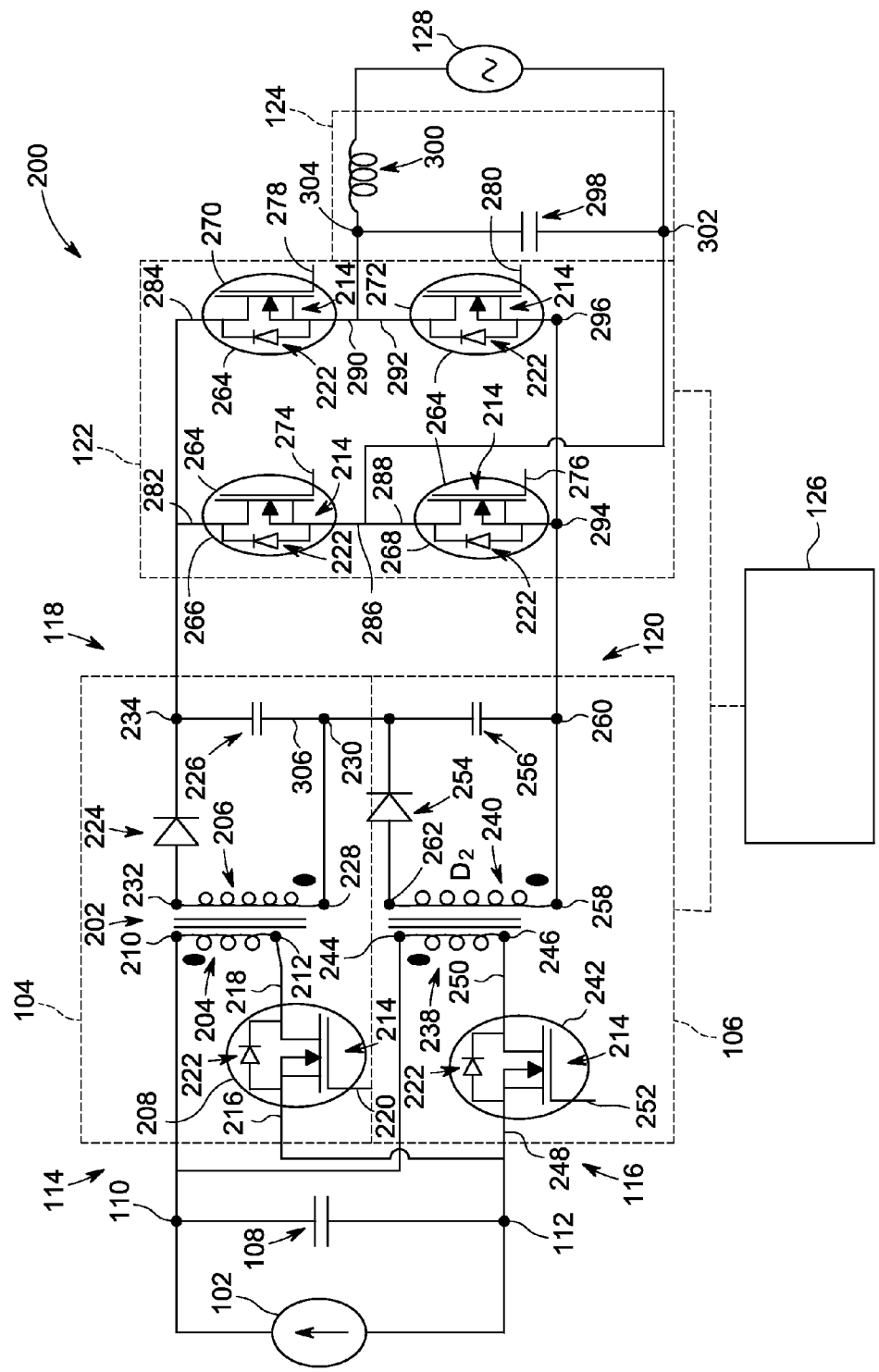
FIG. 2 is a schematic block diagram of another exemplary power conversion system.

FIG. 2 is a schematic diagram of an exemplary power conversion system 200. Unless otherwise specified, power conversion system 200 is similar to power conversion system 100 (shown in FIG. 1), and similar components are labeled in FIG. 2 with the same reference numerals used in FIG. 1.

In an exemplary embodiment, power conversion system 200 includes first converter 104 and second converter 106 coupled to power source 102 and to inverter 122. More specifically, in an exemplary embodiment, first converter 104 and second converter 106 are flyback converters. Alternatively, first converter 104 and second converter 106 may be forward converters, push-pull converters, and/or any other isolated converter that enables power conversion system 200 to function as described herein.

First converter 104 includes a first transformer 202 that includes a primary winding 204 and a secondary winding 206, and a first converter switching device 208 coupled to first transformer 202. In an exemplary embodiment, a first terminal 210 of primary winding 204 is coupled to first node 110, and a second terminal 212 of primary winding 204 is coupled to first converter switching device 208. In an exemplary embodiment, a number of turns, or conductor coils, of first transformer primary winding 204 is less than a number of turns, or conductor coils, of first transformer secondary winding 206 such that first transformer 202 is a "step-up" transformer. Alternatively, first transformer 202 may be any other type of transformer that enables system 200 to function as described herein.

In an exemplary embodiment, first converter switching device 208 includes a metal oxide semiconductor field effect transistor (MOSFET) 214. A source terminal (or source) 216 of first converter switching device 208 is coupled to second node 112, and a drain terminal (or drain) 218 of first converter switching device 208 is coupled to second terminal 212 of first transformer primary winding 204. A gate terminal (or gate) 220 of first converter switching device 208 is coupled to control system 126 for controlling a switching operation of first converter switching device 208. As used herein, the terms "switching" or "switching operation" refer to selectively transitioning a device between an "on" state (i.e., an electrically conductive state) and an "off" state (i.e., an electrically non-conductive state) based on control signals received by the device. First converter switching device 208 includes a diode 222, coupled across source 216 and drain 218. Alternatively, first converter switching device 208 may include a gallium-nitride field effect transistor (GaNFET), an insulated gate bipolar transistor (IGBT), and/or any other device that enables system 200 to function as described herein.

First converter switching device 208 and first transformer primary winding 204 are positioned or included within input side 114 of first converter 104. Output side 118 of first converter 104 includes first transformer secondary winding 206 and a first diode 224. In an exemplary embodiment, output side 118 also includes a first converter output capacitor 226.

In an exemplary embodiment, a first terminal 228 of first transformer secondary winding 206 is coupled to a converter center node 230, and to first converter output capacitor 226 through converter center node 230. In addition, first transformer secondary winding 206 is coupled to output side 120 of second converter 106 through converter center node 230. A second terminal 232 of first transformer secondary winding 206 is coupled to first diode 224, and first diode 224 is coupled to a first converter output node 234. In addition, first diode 224 is coupled to first converter output capacitor 226 through first converter output node 234. An output of first converter 104 is coupled to inverter 122 through first converter output node 234.

Second converter 106 is substantially similar to first converter 104. Accordingly, second converter 106 includes a second transformer 236 that includes a primary winding 238 and a secondary winding 240, and a second converter switching device 242 coupled to second transformer 236. In an exemplary embodiment, a first terminal 244 of second transformer primary winding 238 is coupled to first node 110, and a second terminal 246 of second transformer primary winding 238 is coupled to second converter switching device 242. In an exemplary embodiment, a number of turns, or conductor coils, of second transformer primary winding 238 is less than a number of turns, or conductor coils, of second transformer secondary winding 240 such that second transformer 236 is a "step-up" transformer. Alternatively, second transformer 236 may be any other type of transformer that enables system 200 to function as described herein.

In an exemplary embodiment, second converter switching device 242 includes a MOSFET 214. A source terminal (or source) 248 of second converter switching device 242 is coupled to second node 112, and a drain terminal (or drain) 250 of second converter switching device 242 is coupled to second terminal 246 of second transformer primary winding 238. A gate terminal (or gate) 252 of second converter switching device 242 is coupled to control system 126 for controlling a switching operation of second converter switching device 242. In an exemplary embodiment, control system 126 switches first converter switching device 208 and second converter switching device 242 in an interleaved pattern or fashion such that first converter switching device 208 is in an "on" state when second converter switching device 242 is in an "off" state, and vice versa. In addition, second converter switching device 242 includes diode 222 coupled across source 248 and drain 250. Alternatively, second converter switching device 242 may include a GaNFET, an IGBT, and/or any other device that enables system 200 to function as described herein.

Second converter switching device 242 is coupled in parallel with first converter switching device 208. More specifically, second converter switching device 242 is coupled in series with second transformer primary winding 238, and first converter switching device 208 is coupled in series with first transformer primary winding 204. Second converter switching device 242 and second transformer primary winding 238 are coupled in parallel with first converter switching device 208 and first transformer primary winding 204.

Second converter switching device 242 and second transformer primary winding 238 are positioned or included within input side 116 of second converter 106. Output side 120 of second converter 106 includes second transformer secondary winding 240 and a second diode 254. In an exemplary embodiment, output side 120 also includes a second converter output capacitor 256.

In an exemplary embodiment, a first terminal 258 of second transformer secondary winding 240 is coupled to a second converter output node 260, and to second converter output capacitor 256 through second converter output node 260. In addition, an output of second converter 106 is coupled to inverter 122 through second converter output node 260. A second terminal 262 of second transformer secondary winding 240 is coupled to second diode 254, and second diode 254 is coupled to converter center node 230. In addition, second diode 254 is coupled to second converter output capacitor 256 and to first converter output side 118 through converter center node 230. Accordingly, second transformer secondary winding 240 is coupled in series with first converter secondary winding 206.

In an exemplary embodiment, inverter 122 is a full bridge inverter 122 that is configured as an H-bridge. Inverter 122 is coupled to first converter output side 118 and to second converter output side 120, and supplies alternating current to electrical distribution network 128.

Inverter 122 includes four inverter switching devices 264 coupled together, such as a first inverter switching device 266, a second inverter switching device 268, a third inverter switching device 270, and a fourth inverter switching device 272. In an exemplary embodiment, each inverter switching device 264 is substantially similar to first converter switching device 208 and second converter switching device 242. Accordingly, each inverter switching device 264 includes a MOSFET 214 and a diode 222. Alternatively, each inverter switching device 264 may include a GaNFET, an IGBT, and/or any other device that enables system 200 to function as described herein. A gate 274 of first inverter switching device 266, a gate 276 of second inverter switching device 268, a gate 278 of third inverter switching device 270, and a gate 280 of fourth inverter switching device 272 are coupled to control system 126 for controlling the switching operation of first, second, third, and fourth inverter switching devices 266, 268, 270, and 272, respectively. In addition, first inverter switching device 266 is switched in an interleaved pattern with respect to second inverter switching device 268, and third inverter switching device 270 is switched in an interleaved pattern with respect to fourth inverter switching device 272.

In an exemplary embodiment, a drain 282 of first inverter switching device 266 is coupled to a drain 284 of third inverter switching device 270. A source 286 of first inverter switching device 266 is coupled to a drain 288 of second inverter switching device 268, and a source 290 of third inverter switching device 270 is coupled to a drain 292 of fourth inverter switching device 272. A source 294 of second inverter switching device 268 is coupled to a source 296 of fourth inverter switching device 272. The output of inverter 122 is coupled to filter 124.

Filter 124 includes a filter capacitor 298 and a filter inductor 300 that smooth or reduce a ripple voltage and/or current within the output voltage and/or current received from inverter 122. In an exemplary embodiment, filter capacitor 298 is coupled in parallel with electrical distribution network 128, and is coupled between an output node 302 of first and second inverter switching devices 266 and 268 and an output node 304 of third and fourth inverter switching devices 270 and 272. In addition, filter inductor 300 is coupled in series with electrical distribution network 128 and to output node 304 of third and fourth inverter switching devices 270 and 272. Filter inductor 300 is also coupled to filter capacitor 298. The output of filter 124 is coupled to electrical distribution network 128 to provide filtered, substantially sinusoidal AC voltage and current to system 200.

During operation, power source 102 supplies substantially DC voltage and current to power conversion system 200. The DC voltage and current are received by first converter 104 and second converter 106. Control system 126 uses substantially sinusoidal control signals to modulate, or control, a duty cycle of first converter switching device 208 and second converter switching device 242. In an exemplary embodiment, the control signals received by gates 220 and 252 of first converter switching device 208 and second converter switching device 242, respectively, are interleaved, or phase-shifted, about 180 degrees with respect to each other. If power conversion system 200 includes two or more converters, each converter switching device will be interleaved, or phase-shifted, a number of degrees equal to about 360/n with respect to an adjacent converter switching device, where n is equal to the number of converters in power conversion system 200.

When first converter switching device 208 is switched to an electrically conductive ("on") state, current is transmitted to first transformer 202, and energy is stored therein. When first converter switching device 208 is switched to an electrically non-conductive ("off") state, the energy stored in first transformer 202 is transmitted to first converter output side 118, i.e., to converter center node 230 and to first converter output node 234. Second converter switching device 242 operates in a similar manner as first converter switching device 208, with the energy of second transformer 236 transmitted to second converter output node 260 and converter center node 230.

First converter output capacitor 226 and second converter output capacitor 256 form a DC bus 306 within first converter 104 and second converter 106. The switching operations of first converter switching device 208 and second converter switching device 242 are controlled to produce a full rectified unidirectional sinusoidal voltage and current across DC bus 306 (i.e., across first converter output capacitor 226 and second converter output capacitor 256). The rectification of the voltage and current may produce a ripple current that flows through first converter output capacitor 226 and second converter output capacitor 256.

The rectified voltage and current is transmitted to inverter 122 which converts the rectified voltage and current to an AC voltage and current that substantially match a frequency and phase of electrical distribution network 128. More specifically, the switching of each inverter switching device 264 is controlled by control system 126 to occur at a frequency of electrical distribution network 128 and at a zero-crossing of the voltage of electrical distribution network 128. As used herein, the term "zero-crossing" refers to a time when a voltage or current transitions from a positive value to a negative value, and/or when the voltage or current transitions from a negative value to a positive value. An amount of power lost due to switching operations of switching devices is based on the voltage and current of a switching device during each switching operation. Accordingly, causing inverter switching devices 264 to switch when the electrical distribution network voltage is about 0 volts substantially eliminates power lost from the switching operations within inverter 122. In addition, control system 126 prevents first and second inverter switching devices 266 and 268 from being in an on state at the same time, and prevents third and fourth inverter switching devices 270 and 272 from being in an on state at the same time to prevent a short circuit across the output of first converter 104 and second converter 106, i.e., across DC bus 306.

As described herein, inputs (e.g., input side 114 and input side 116) of first converter 104 and second converter 106 are coupled together in parallel, and outputs (e.g., output side 118 and output side 120) are coupled together in series. In the exemplary embodiment, first converter switching device 208 and second converter switching device 242 are switched in an interleaved pattern using a sine wave control signal to convert DC power received from power source 102 into AC power exhibiting a fully rectified sine wave current and/or voltage. Converters 104 and 106 are coupled to an H-bridge inverter 122 that receives the fully rectified sine wave current and/or voltage produced by converters 104 and 106 and converts the sine wave to "grid-quality" power (i.e., power that substantially matches the voltage and/or current characteristics of electrical distribution network 128). Moreover, in the exemplary embodiment, first converter switching device 208, second converter switching device 242, and/or inverter switching devices 264 are switched at each zero crossing of the voltage of electrical distribution network 128.

The peak voltage at each of first converter output capacitor 226 and second converter output capacitor 256 is equal to about half of the peak voltage of electrical distribution network 128 because first converter output capacitor 226 and second converter output capacitor 256 are connected in series, and the sum of the two capacitor voltages substantially equals the voltage of electrical distribution network 128. With power conversion system 200 configured in an input-parallel output-series configuration, a decreased voltage output is possible for first converter 104 and second converter 106, and a reduced transformer turns ratio (i.e., a reduced ratio of the number of secondary turns or windings to the number of primary turns or windings) are possible for first transformer 202 and second transformer 236 as compared to prior art systems having converter outputs coupled together in parallel.

A voltage across each switching device of first converter 104 (e.g., first converter switching device 208 and second converter switching device 242) is about equal to an input voltage to the switching device (e.g., from power source 102) plus a reflected voltage from a transformer coupled to the switching device (e.g., first transformer 202 or second transformer 236). Moreover, for a given current rating, a MOSFET with a lower voltage rating will have a lower resistance as compared to a MOSFET with a higher voltage rating. By adjusting or reducing the transformer turns ratio of first transformer 202 and second transformer 236, the peak voltage across each of first converter switching device 208 and second converter switching device 242 is reduced. Accordingly, MOSFETs or other switches with a low "on" resistance may be used for converter switching devices such as first and/or second converter switching device 208 and/or 242.

In a "hard switching" continuous conduction mode of operation, the decreased peak voltage across each of first converter switching device 208 and second converter switching device 242 (which is possible using switches with a low "on" resistance) reduces a loss due to switching of each converter switching device 208 and 242. Moreover, the reduced voltage produced as a result of the series coupled outputs of first converter 104 and second converter 106 reduces the required number of secondary turns of first transformer 202 and second transformer 236. Since the turns ratio of first transformer 202 and second transformer 236 are decreased, the primary and secondary windings of first transformer 202 (e.g., first transformer primary winding 204 and first transformer secondary winding 206) and of second transformer 236 (e.g., second transformer primary winding 238 and second transformer secondary winding 240) can be closely coupled together such that an amount of leakage energy of first transformer 202 and second transformer 236 can be reduced.

Figure 3:
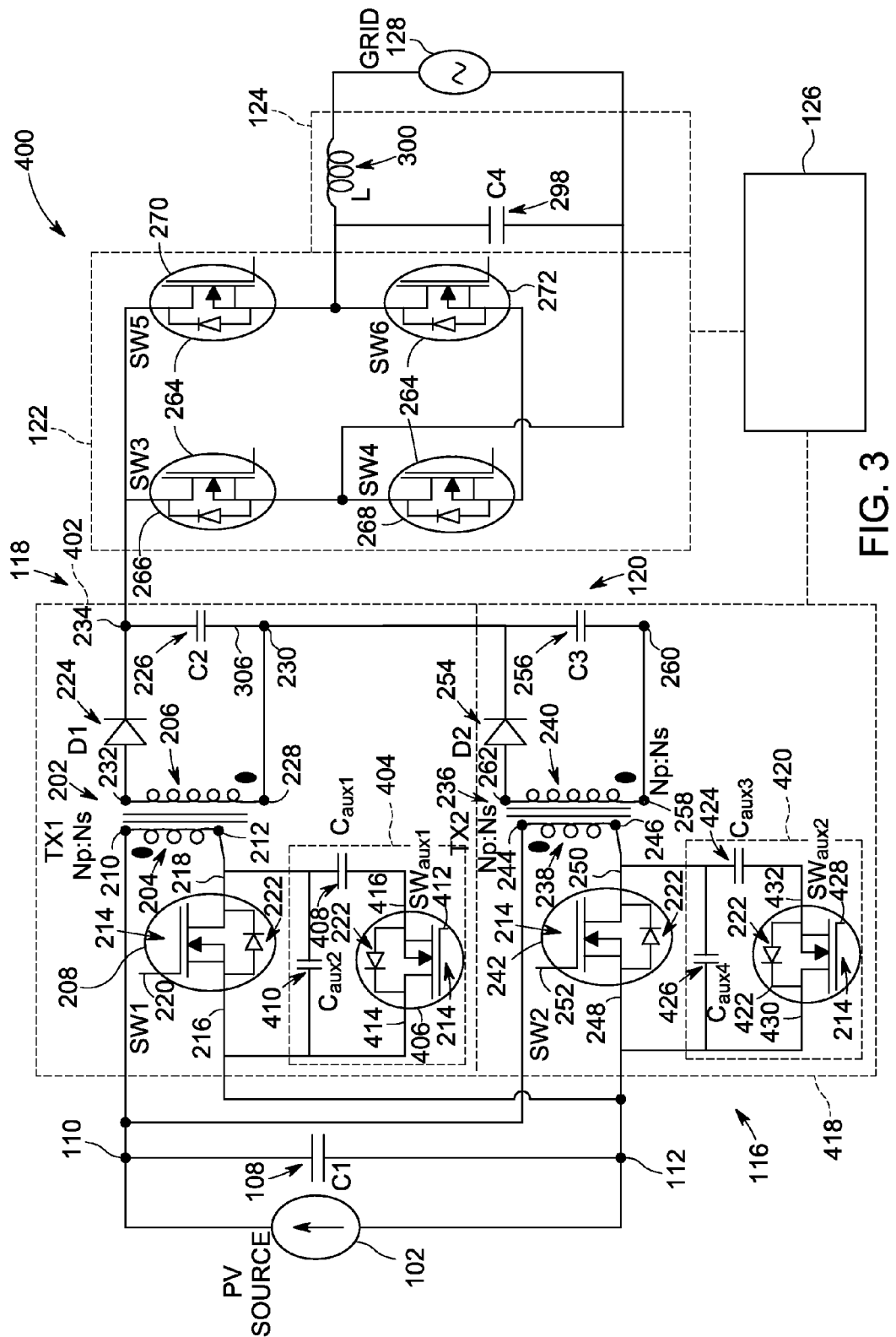
FIG. 3 is a schematic block diagram of another exemplary power conversion system.

FIG. 3 is a schematic block diagram of another exemplary power conversion system 400. Unless otherwise specified, power conversion system 400 is similar to power conversion system 200 (shown in FIG. 2), and similar components are labeled in FIG. 3 with the same reference numerals used in FIG. 2.

In an exemplary embodiment, a first converter 402 includes a first resonant frequency circuit 404 coupled in parallel with first converter switching device 208. More specifically, in an exemplary embodiment, first resonant frequency circuit 404 is a zero voltage switching (ZVS) circuit that enables first converter switching device 208 and first resonant frequency circuit 404 to be switched at zero voltage events.

As used herein, the term "zero voltage event" refers to a time in which the voltage across a switch or device is approximately 0 volts (V). In addition, as used herein, the term "zero current event" refers to a time in which the current flowing through the switch or device is approximately 0 amperes (A). Accordingly, a zero voltage switching device is a device that switches, or transitions between electrically conductive and non-conductive states, at zero voltage events, and a zero current switching device is a device that switches, or transitions between electrically conductive and non-conductive states, at zero current events.

First resonant frequency circuit 404 includes a first resonant switching device 406, a first resonant capacitor 408, and a second resonant capacitor 410. In an exemplary embodiment, first resonant switching device 406 includes a MOSFET 214 and a diode 222. Alternatively, first resonant switching device 406 may include a GaNFET, an IGBT, and/or any other device that enables system 400 to function as described herein. A gate 412 of first resonant switching device 406 is coupled to control system 126 for controlling the switching operation of first resonant switching device 406.

In an exemplary embodiment, a drain 414 of first resonant switching device 406 is coupled to source 216 of first converter switching device 208 and to second resonant capacitor 410. A source 416 of first resonant switching device 406 is coupled to first resonant capacitor 408. In addition, first and second resonant capacitors 408 and 410 are coupled to drain 218 of first converter switching device 208 and to first transformer primary winding 204.

In a similar manner, a second converter 418 includes a second resonant frequency circuit 420 coupled in parallel with second converter switching device 242. More specifically, in an exemplary embodiment, second resonant frequency circuit 420 is a ZVS that enables second converter switching device 242 to be switched at zero voltage events of electrical distribution network 128.

Second resonant frequency circuit 420 includes a second resonant switching device 422, a third resonant capacitor 424, and a fourth resonant capacitor 426. In an exemplary embodiment, second resonant switching device 422 includes a MOSFET 214 and a diode 222. Alternatively, second resonant switching device 422 may include a GaNFET, an IGBT, and/or any other device that enables system 400 to function as described herein. A gate 428 of second resonant switching device 422 is coupled to control system 126 for controlling the switching operation of second resonant switching device 422.

In an exemplary embodiment, a drain 430 of second resonant switching device 422 is coupled to source 248 of second converter switching device 242 and to fourth resonant capacitor 426. A source 432 of second resonant switching device 422 is coupled to third resonant capacitor 424. In addition, third and fourth resonant capacitors 424 and 426 are coupled to drain 250 of second converter switching device 242 and to second transformer primary winding 238.

During operation, current is provided to power conversion system 400 by power source 102. As the operation of first converter 402 is similar to the operation of second converter 418, the description of second converter 418 operation is omitted for clarity. In an exemplary embodiment, first converter switching device 208 and first resonant switching device 406 are switched at zero voltage events and/or zero current events for the respective switching device. When first converter switching device 208 is on and first resonant switching device 406 is off, current flows from power source 102 to first transformer primary winding 204, and returns to power source 102 through first converter switching device 208. When first converter switching device 208 is switched off, such as at a zero voltage event or a zero current event, current is directed through first transformer primary winding 204 and returns to power source 102 through second resonant capacitor 410. In addition, a portion of the current flowing from first transformer primary winding 204 is directed through first resonant capacitor 408 and through diode 222 of first resonant switching device 406. At least a portion of the energy stored in first transformer 202 is released from first transformer secondary winding 206 as a current flowing through first diode 224 to an output of power conversion system 400.

When first resonant switching device 406 is switched to an on state, such as during a zero voltage or zero current event, current flows from power source 102 through first transformer primary winding 204 and is returned to power source 102 through first resonant switching device 406, substantially bypassing diode 222 of first resonant switching device 406. During a negative power cycle, current flows from power source 102 to first transformer primary winding 204 through first resonant switching device 406 and first resonant capacitor 408, and is returned to power source 102. When current flows through first resonant capacitor 408, a leakage inductance of first transformer 202 is in resonance with first resonant capacitor 408.

When first resonant switching device 406 is switched to an off state (while first converter switching device 208 is also in an off state), such as during a zero voltage or zero current event, current flows from power source 102 through second resonant capacitor 410 to first transformer primary winding 204, and is returned to power source 102. In addition, at least a portion of the current from power source 102 flows through diode 222 of first converter switching device 208 and to first transformer primary winding 204. When first converter switching device 208 is switched from the off state to the on state, current flows from power source 102 to first transformer primary winding 204 through first converter switching device 208. Other components of power conversion system 400, such as inverter 122 and filter 124, operate as described above with reference to FIG. 2.

Figure 4:
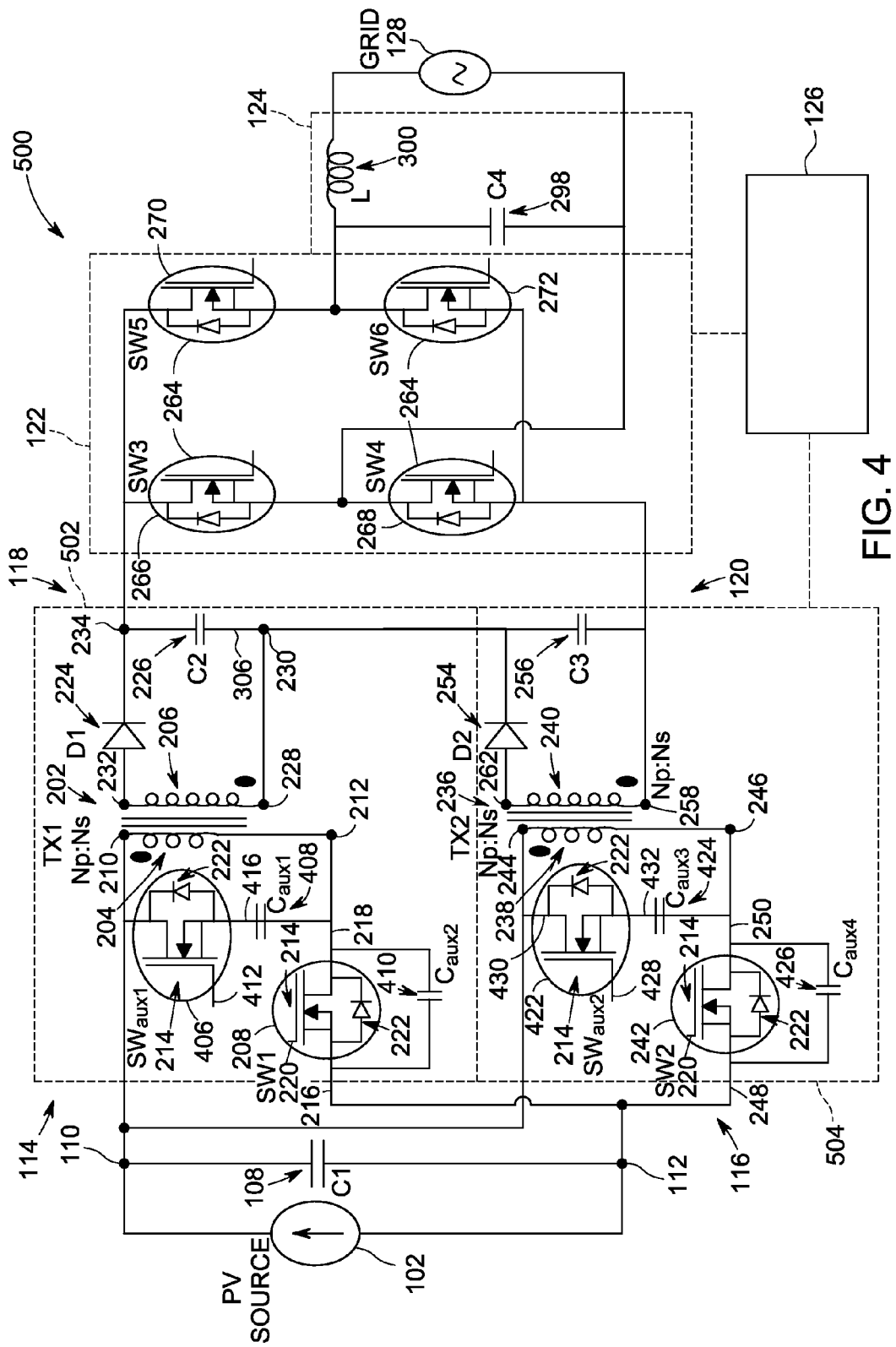
FIG. 4 is a schematic block diagram of yet another power conversion system.

FIG. 4 is a schematic block diagram of another exemplary power conversion system 500. Unless otherwise specified, power conversion system 500 is similar to power conversion system 400 (shown in FIG. 3), and similar components are labeled in FIG. 4 with the same reference numerals used in FIG. 3.

In an exemplary embodiment, power conversion system 500 includes a first converter 502 including first resonant switching device 406 and first resonant capacitor 408 that are coupled in parallel with first transformer primary winding 204. Second resonant capacitor 410 is coupled in parallel with first converter switching device 208. Similarly, power conversion system 500 includes a second converter 504 including second resonant switching device 422 and third resonant capacitor 424 that are coupled in parallel with second transformer primary winding 238. Fourth resonant capacitor 426 is coupled in parallel with second converter switching device 242. In other respects, first converter 502 is substantially similar to first converter 402 (shown in FIG. 3) and second converter 504 is substantially similar to second converter 418 (shown in FIG. 3).

During operation, when first transformer 202 is in resonance with first resonant capacitor 408 (as described above with reference to FIG. 3), current is returned to power source 102 from first resonant capacitor 408. In other respects, power conversion system 500 functions substantially similar to power conversion system 400.

Figure 5:
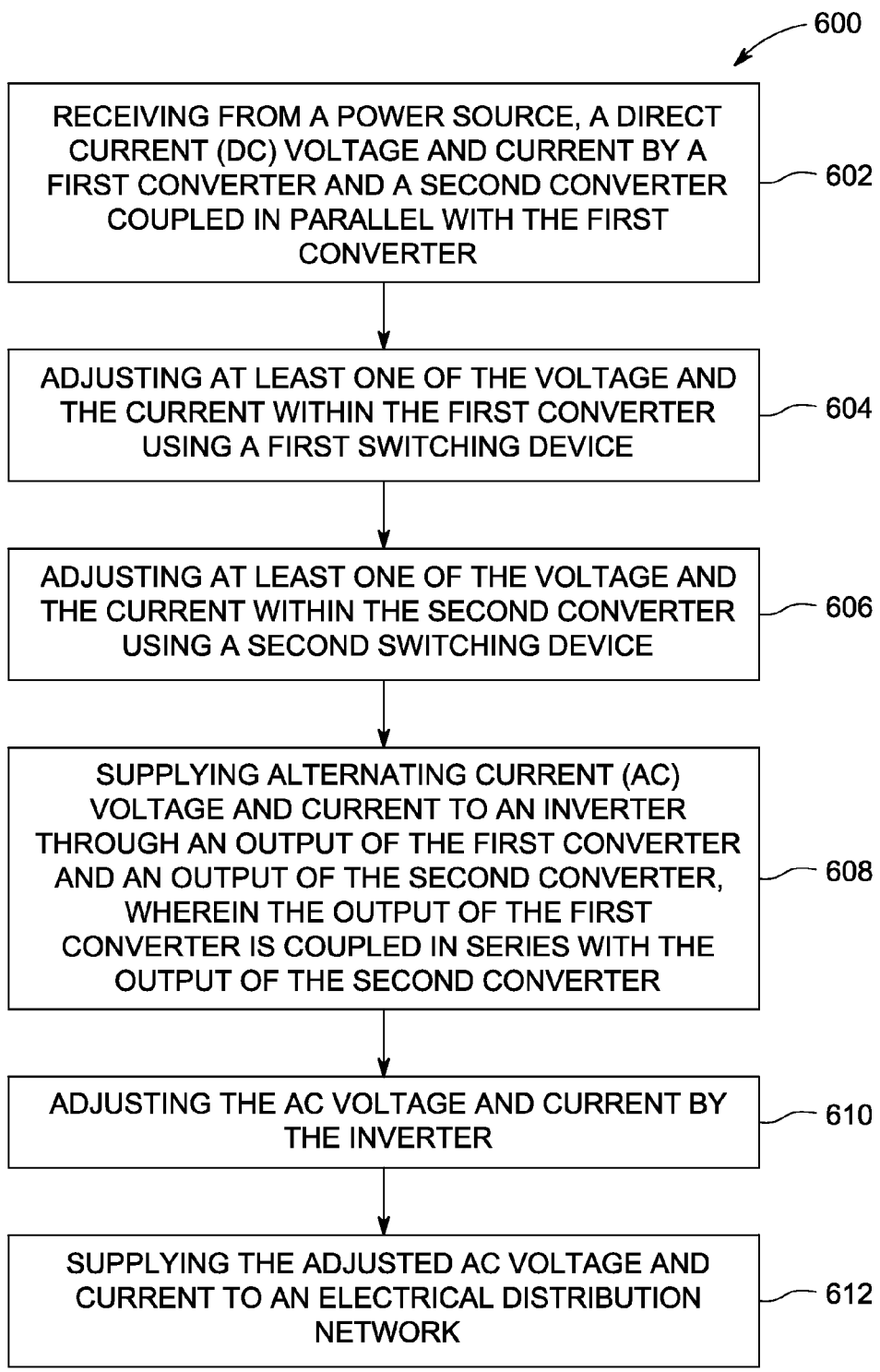
FIG. 5 is a flow diagram of an exemplary method for adjusting power that may be used with a power conversion system shown in FIGS. 1-4.

FIG. 5 is a flow diagram of an exemplary method 600 for adjusting or converting power received from a power source, such as power source 102 (shown in FIG. 1), that may be used with power conversion system 400 (shown in FIG. 3) or with power conversion systems 100, 200, or 500 (shown in FIGS. 1, 2, and 4, respectively). In an exemplary embodiment, method 600 is embodied within a plurality of instructions stored within a memory device positioned within a control system, such as control system 126 (shown in FIG. 1). In addition, method 600 is at least partially executed by a processor within control system 126.

In an exemplary embodiment, a DC voltage and current are received 602 from power source 102 by first converter 402 and second converter 418 (both shown in FIG. 3) of power conversion system 400. Second converter 418 is coupled in parallel with first converter 402. At least one of the voltage and the current within first converter 402 is adjusted 604 (or converted) using first converter switching device 208 (shown in FIG. 2), and at least one of the voltage and the current within second converter 418 is adjusted 606 (or converted) using second converter switching device 242 (shown in FIG. 2). More specifically, first converter switching device 208 is switched at a zero crossing of the voltage across first converter switching device 208 and/or at a zero crossing of the current flowing through first converter switching device 208. Similarly, second converter switching device 242 is switched at a zero crossing of the voltage across second converter switching device 242 and/or at a zero crossing of the current flowing through second converter switching device 242.

As a result of the switching of first converter switching device 208 and second converter switching device 242, first converter 402 and second converter 418 supply 608 AC voltage and current to inverter 122 (shown in FIG. 2) through an output of first converter 402 and an output of second converter 418. In an exemplary embodiment, the output of first converter 402 is coupled in series with the output of second converter 418.

The AC voltage and current is adjusted 610 by inverter 122 and the adjusted AC voltage and current is supplied 612 to electrical distribution network 128. More specifically, inverter 122 includes at least one inverter switching device 264, or a plurality of inverter switching devices 264 arranged in an H-bridge configuration. The inverter switching devices 264 are switched at a zero crossing of the voltage and/or the current of electrical distribution network 128 to adjust the AC voltage and current and to supply 612 the adjusted AC voltage and current to electrical distribution network 128.

A technical effect of the method and systems described herein may include one or more of: (a) receiving, from a power source, a direct current (DC) voltage and current by a first converter and a second converter coupled in parallel with the first converter; (b) adjusting at least one of a voltage and a current within a first converter using a first switching device; (c) adjusting at least one of a voltage and a current within a second converter using a second switching device; (d) supplying alternating current (AC) voltage and current to an inverter through an output of a first converter and an output of a second converter, wherein the output of the first converter is coupled in series with the output of the second converter; (e) adjusting AC voltage and current by an inverter; and (f) supplying adjusted AC voltage and current to an electrical distribution network.

Exemplary embodiments of a method and systems for converting power are described above in detail. The method and systems are not limited to the specific embodiments described herein but, rather, operations of the method and/or components of the systems may be utilized independently and separately from other operations and/or components described herein. Further, the described operations and/or components may also be defined in, or used in combination with, other systems, methods, and/or devices, and are not limited to practice with only the systems and method as described herein.

Although the present invention is described in connection with an exemplary power conversion system, embodiments of the invention are operational with numerous other power systems, or other systems or devices. The power conversion system described herein is not intended to suggest any limitation as to the scope of use or functionality of any aspect of the invention. In addition, the power conversion system described herein should not be interpreted as having any dependency or requirement relating to any one or combination of components illustrated in the exemplary operating environment.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power conversion system comprising:
   a first converter coupled to a power source, wherein said first converter comprises an input side, and an output side comprising a first output capacitor electrically isolated from said input side;
   a second converter coupled to the power source, wherein said second converter comprises an input side, and an output side comprising a second output capacitor electrically isolated from said input side, said second converter input side is coupled in parallel with said first converter input side and said second output capacitor is coupled in series with said first output capacitor; and
   an inverter coupled to said first converter output side and to said second converter output side, wherein said inverter supplies alternating current to an electrical distribution network.

2. A power conversion system in accordance with claim 1, wherein said inverter is an H-bridge inverter.

3. A power conversion system in accordance with claim 1, wherein said first converter is a flyback converter comprising a first transformer, and wherein said first transformer comprises a primary winding and a secondary winding.

4. A power conversion system in accordance with claim 3, wherein said second converter is a flyback converter comprising a second transformer, and wherein said second transformer comprises a primary winding and a secondary winding.

5. A power conversion system in accordance with claim 4, wherein said first converter secondary winding is coupled in series with said second converter secondary winding.

6. A power conversion system in accordance with claim 4, wherein said first converter comprises a first switching device and said second converter comprises a second switching device, wherein said first switching device and said first transformer primary winding are coupled in parallel with said second switching device and said second transformer primary winding.

7. A power conversion system in accordance with claim 6, wherein said first switching device and said second switching device include metal oxide semiconductor field effect transistors (MOSFETs).

8. A power conversion system in accordance with claim 6, wherein said first switching device and said second switching device are switched in an interleaved pattern.

9. A power conversion system in accordance with claim 6, wherein said first converter comprises a first resonant circuit that enables said first converter switching device to be switched at a zero crossing of a voltage across said first converter switching device.

10. A power conversion system in accordance with claim 9, wherein said second converter comprises a second resonant circuit that enables said second converter switching device to be switched at a zero crossing of a voltage across said second converter switching device.

11. A method of adjusting power, said method comprising:
receiving, from a power source, a direct current (DC) voltage and current by a first converter and a second converter coupled in parallel with the first converter;
adjusting at least one of the voltage and the current within the first converter using a first switching device;
adjusting at least one of the voltage and the current within the second converter using a second switching device;
supplying alternating current (AC) voltage and current to an inverter through an output of the first converter and an output of the second converter, wherein the output of the first converter includes a first output capacitor and the output of the second converter includes a second output capacitor, the first output capacitor coupled in series with the second output capacitor;
adjusting the AC voltage and current by the inverter; and
supplying the adjusted AC voltage and current to an electrical distribution network.

12. A method in accordance with claim 11, further comprising switching the first switching device at a zero crossing of a voltage across the first switching device.

13. A method in accordance with claim 11, further comprising:
switching the first switching device at a zero crossing of a voltage across the first switching device; and
switching the second switching device at a zero crossing of a voltage across the second switching device.

14. A method in accordance with claim 11, wherein the inverter includes at least one switching device, said method further comprising switching the at least one switching device of the inverter at a zero crossing of a voltage of the electrical distribution network.

15. A power conversion system, comprising:
a first converter coupled to a solar power source, wherein said first converter comprises an input side, an output side comprising a first output capacitor, and a first switching device;
a second converter coupled to the solar power source, wherein said second converter comprises an input side, an output side comprising a second output capacitor, and a second switching device, said second converter input side is coupled in parallel with said first converter input side and said second output capacitor is coupled in series with said first output capacitor;
an inverter coupled to said first converter output side and to said second converter output side, wherein said inverter supplies alternating current to an electrical distribution network; and
a control system coupled to said first converter, said second converter, and said inverter, wherein said control system is configured to control said first switching device and said second switching device.

16. A power conversion system in accordance with claim 15, wherein said control system switches said first switching device and said second switching device in an interleaved pattern.

17. A power conversion system in accordance with claim 15, wherein said inverter comprises a plurality of inverter switching devices arranged in an H-bridge configuration, said control system switches said plurality of inverter switching devices.

18. A power conversion system in accordance with claim 15, wherein said inverter comprises a plurality of inverter switching devices arranged in an H-bridge configuration, said control system switches at least one of said plurality of inverter switching devices at a zero crossing of at least one of a voltage and a current of the electrical distribution network.

19. A power conversion system in accordance with claim 15, wherein said first converter comprises a first resonant circuit that enables said first converter switching device to be switched at a zero crossing of a voltage across said first converter switching device.

20. A power conversion system in accordance with claim 19, wherein said second converter comprises a second resonant circuit that enables said second converter switching device to be switched at a zero crossing of a voltage across said second converter switching device.

* * * * *